United States Patent
Janssen

(10) Patent No.: US 6,234,556 B1
(45) Date of Patent: May 22, 2001

(54) BODY FLAP FOR A TANK FILLER NECK WITH A REMOTE UNLOCKING MECHANISM

(75) Inventor: Heinz G. Janssen, Koeln (DE)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/316,594

(22) Filed: May 21, 1999

(30) Foreign Application Priority Data

May 23, 1998 (EP) .................................................. 98109399

(51) Int. Cl.⁷ ................................................. B60K 15/05
(52) U.S. Cl. .......................................................... 296/97.22
(58) Field of Search ........................................... 296/97.22

(56) References Cited

U.S. PATENT DOCUMENTS

| | | | | |
|---|---|---|---|---|
| 3,750,825 | * | 8/1973 | Bachle | 296/97.22 |
| 4,620,744 | * | 11/1986 | Yui et al. | 296/97.22 |
| 4,811,984 | * | 3/1989 | Hempel | 296/97.22 |
| 4,917,404 | * | 4/1990 | Pasquali et al. | 296/97.22 |
| 4,971,382 | * | 11/1990 | Ohmo | 296/97.22 |
| 5,044,678 | * | 9/1991 | Detweiler | 296/97.22 |
| 5,080,421 | * | 1/1992 | Otowa et al. | 296/97.22 |
| 5,454,618 | * | 10/1995 | Sullivan | 296/97.22 |
| 5,520,431 | * | 5/1996 | Kapes et al. | 296/97.22 |
| 5,538,312 | * | 7/1996 | Lehmkuhl | 296/97.22 |
| 5,772,062 | * | 6/1998 | Grames | 296/97.22 |

FOREIGN PATENT DOCUMENTS 25 33 104      2/1977  (DE) .

* cited by examiner

Primary Examiner—D. Glenn Dayoan
Assistant Examiner—Greg Blankenship
(74) Attorney, Agent, or Firm—Joseph W. Malleck

(57) ABSTRACT

A body flap for the tank filler neck with an electrical remote unlocking mechanism having a locking bolt that can be engaged with a spring and disengaged with a solenoid, from a closure part on a body flap, the solenoid and the locking bolt arranged in the side limbs of a U-shaped plastic component, which has a U-shaped cross section, and the armature rod of the solenoid connected to the locking bolt via a two-armed lever which is mounted such that it can pivot on a pivot in the base of the U-shaped plastic component.

3 Claims, 3 Drawing Sheets

BODY FLAP FOR A TANK FILLER NECK WITH A REMOTE UNLOCKING MECHANISM

TECHNICAL FIELD

The invention relates to a body flap for the tank filler neck with a remote unlocking mechanism for passenger vehicles using a locking bolt engaged with a closure part by way of a spring and disengaged from the closure part by way of a solenoid.

DISCUSSION OF THE PRIOR ART

DE 25 33 104 A1 discloses a tank closure for passenger vehicles with a remote unlocking mechanism in which a spring-loaded locking bolt can be disengaged, via a solenoid, from a closure part on a body flap. In the case of the known tank closure for passenger vehicles, the solenoid can be arranged directly on a base plate which can be arranged in the direct vicinity of the body hollow which accommodates the tank filler neck. In this known body flap for the tank filler neck with a remote unlocking mechanism, the region directly adjacent to the body hollow, which accommodates the tank filler neck, has to be accessible from the body interior, and an appropriate fixing means for the base plate, on which the solenoid is arranged, has to be provided. In the case of a passenger vehicle of the sports coupe type, as a consequence of the short, rear body overhang and the tank filler neck arrangement which is required because of the tank position, the difficulty can arise of the region directly adjacent to the body hollow of the tank filler neck not being readily accessible for the installation of a base plate with a solenoid and the locking bolts.

SUMMARY OF THE INVENTION

An object of the invention is to provide an assembly for a body flap for the tank filler neck with a remote unlocking mechanism, which assembly enables the locking bolt, which interacts with the body flap, to be used even in difficult space conditions and enables the base plate to be mounted in a readily accessible position. According to the invention this object is achieved by a body flap for a tank filler neck, of the type explained in the preamble of patent claim 1, having the features listed in the defining part of patent claim 1.

As the result of the solenoid and the locking bolt being arranged in the side limbs of a U-shaped plastic component, and the armature of the solenoid acting on the locking bolt via a lever linkage which is mounted in the base of the U-shaped plastic component, a U-shaped assembly is provided in which the locking bolt can extend, supported via a seal, into the body hollow of the tank filler neck and this assembly can be fixed in a position which is favorable for installation with its base plate, which is formed by one side limb, on an inside panel of the body. A Bowden cable laid in a U-shaped bend can be used instead of the lever linkage.

A lever arrangement may be used to make manual unlocking possible if there is a fault in the electrical system.

DESCRIPTION OF THE PREFERRED EMBODIMENT

Figure 1:
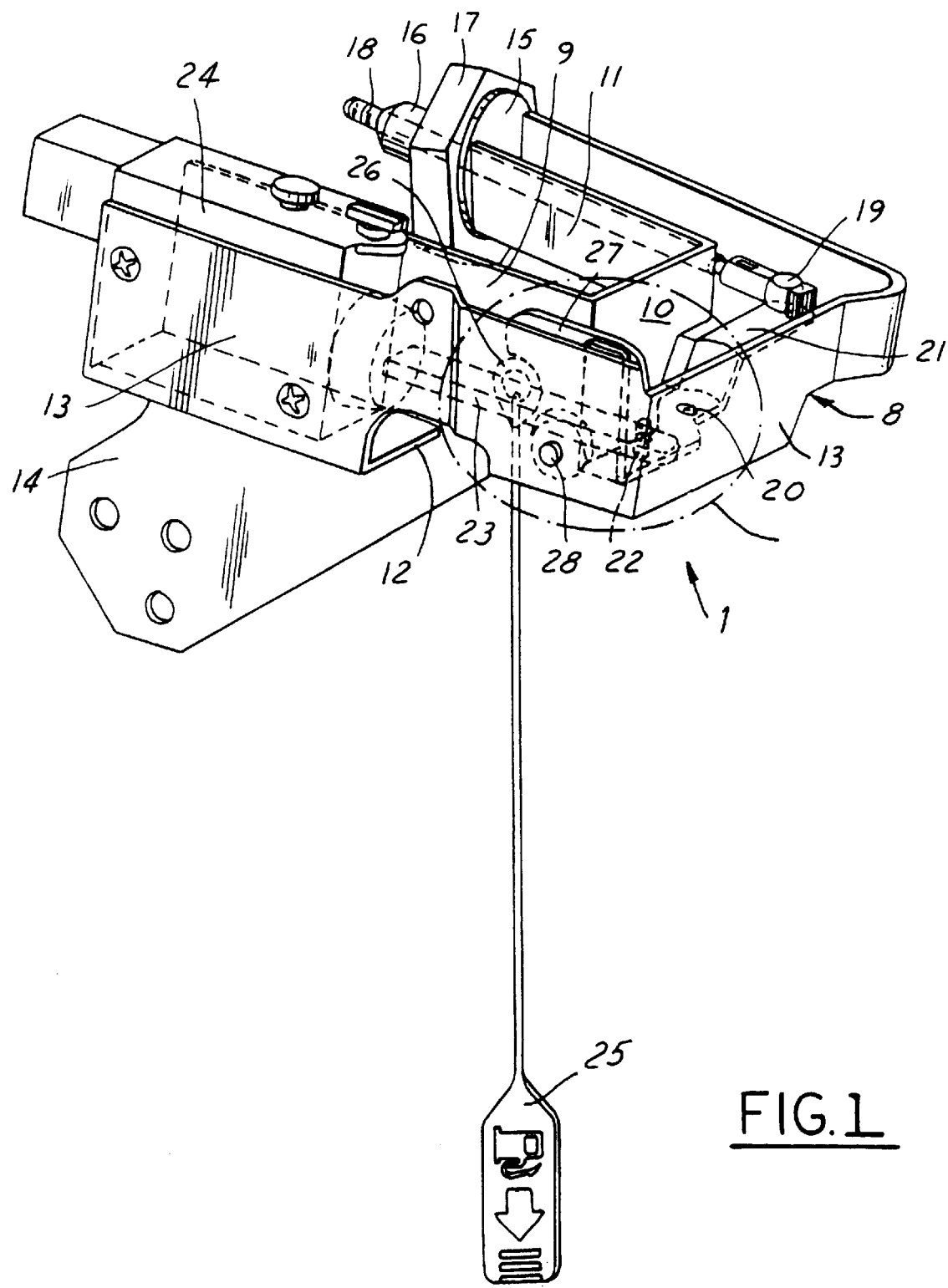
FIG. 1 shows a perspective view of the structure of this invention showing a novel U-shaped assembly, locking bolt, solenoid, and the transmission linkage.
Figure 2:
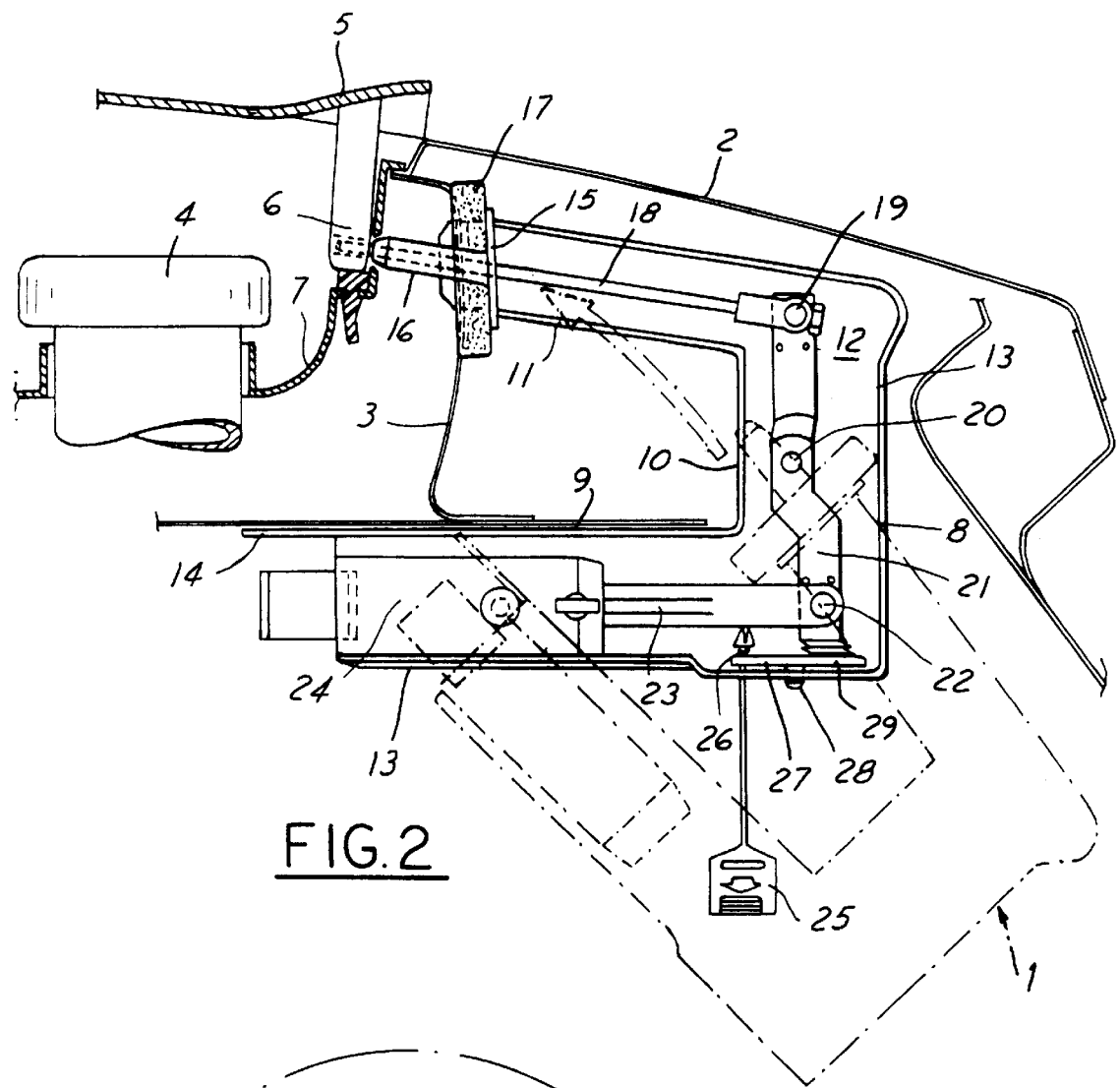
FIG. 2 shows a vertical sectional representation through the rear region of a motor vehicle body with the body hollow for the tank filler neck indicated and with the body flap and the assembly according to the invention in the installed state, the installation option being indicated by dash-dotted lines.
Figure 3:
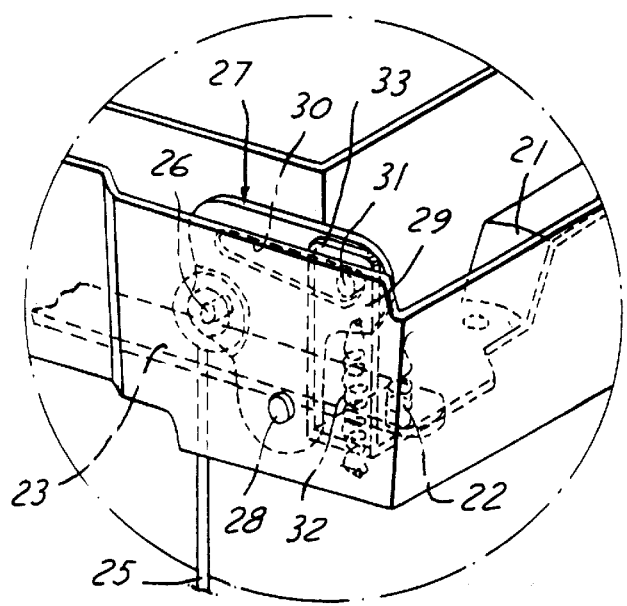
FIG. 3 shows an enlarged representation of the emergency unlocking mechanism in the circle III of FIG. 1.

As seen in FIGS. 1 and 2, the U-shaped assembly 1 is provided in order to be able to use a solenoid to remotely unlock the body hollow 3, which is provided within a motor vehicle body 2 and is intended for a tank filler neck 4, and the tank flap 5, which covers this hollow, via its closure part 6. A plastic housing 7, in which the tank flap 5, which consists of plastic, is mounted pivotably in a known manner, is inserted into the body hollow 3.

The U-shaped assembly 1 consists in this case of a U-shaped plastic component 8 with an upwardly open U-shaped cross section. The U-shaped plastic component 8 thereby forms an inner side limb 9, a base 10 and an outer side limb 11. These side walls 9, 10 and 11 are adjoined by the base 12 to the plastic component 8 with the corresponding, peripheral, outer side wall 13.

The inner side limb 9 is extended downward in this case to form an installation base plate 14 and the side limb 11 is closed off by an end plate 15 with a guide sleeve 16 and close-fitting seal 17.

A locking bolt 18 extends through the end plate 15 with the guide sleeve 16 and through the seal 17, the inner end of which locking bolt is connected, via a knuckle joint 19, to a lever arm 21 mounted about a pivot 20 in the base 12 of the plastic component 8, and the other end of which locking bolt is connected, via a knuckle joint 22, to an armature rod 23 of a solenoid 24 which is held, via corresponding screws, in the U-shaped cross section of the plastic component 8 which lies adjacent to the installation base plate 14.

An emergency unlocking mechanism in the form of a pull handle 25 acts on a bolt 26 of a two-armed lever 27 which is mounted such that it can be rotated about a bolt 28 in the outer side wall 13 in the U-shaped plastic component 8 and whose other lever arm 29 can act in the unlocking direction, via a slot/bolt connection 30/31, on an end 33 of the lever arm 21, which end is bent upward at right angles, if, for example, the solenoid is not able to perform the unlocking because of a mechanical fault or because of a power failure.

If the emergency unlocking mechanism has been activated, a restoring spring 32 causes the lever 27 to be set back into the normal position. When activation takes place normally via the solenoid, the lever 27 remains immobile due to the slot/bolt connection 30/31.

Figure 4:
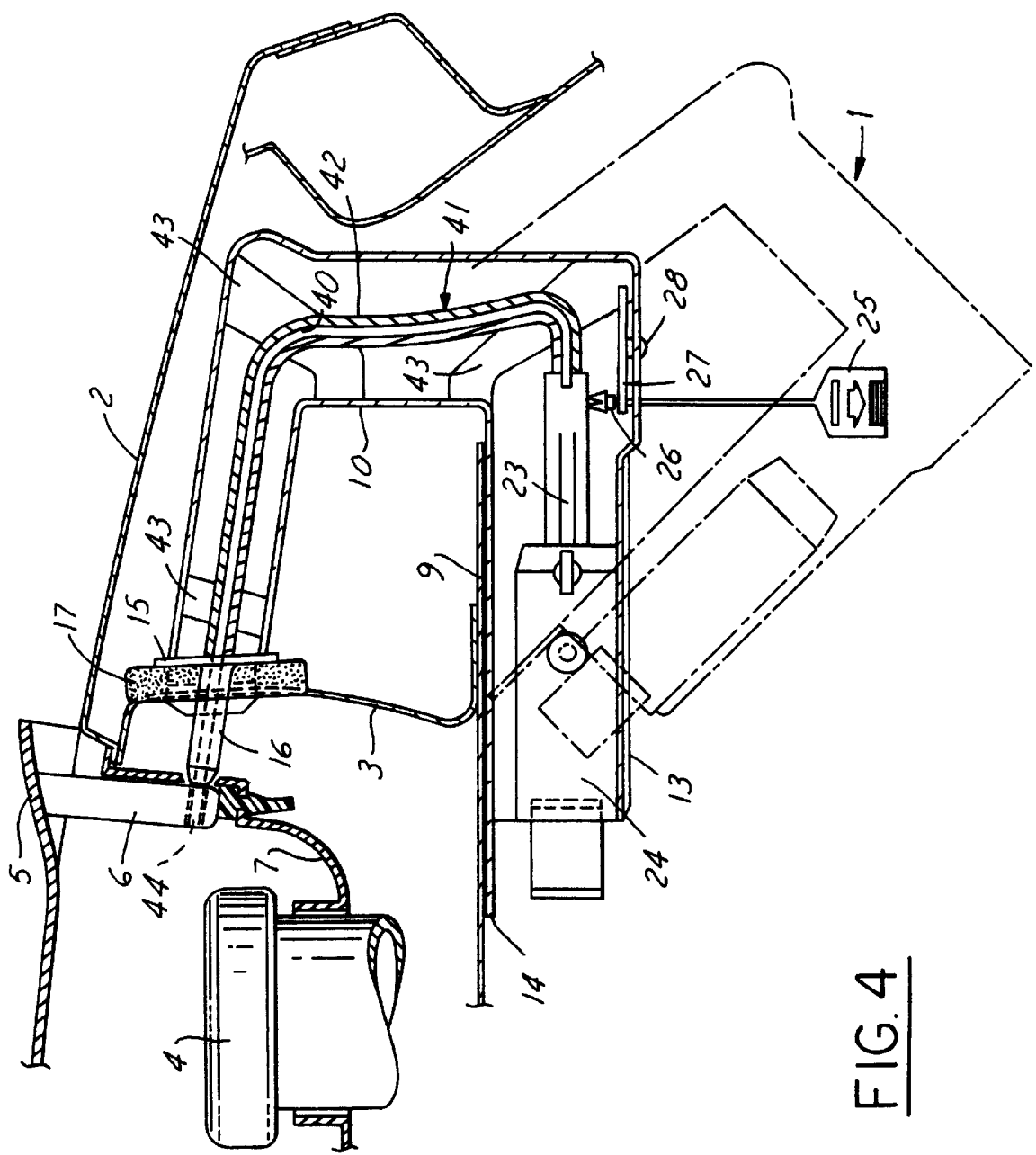
FIG. 4 shows another embodiment of the invention similar to the vertical sectional representation of FIG. 2 having a Bowden cable arrangement.

Although the U-shaped assembly according to the invention in the form of a plastic component has been shown and described with a corresponding lever arrangement, it is obvious to one skilled in the art that in difficult space conditions he is similarly able to provide an assembly which can be fitted easily, if he allows the armature rod 23 of the solenoid to act on the core 40 of a Bowden cable arrangement 41 whose sheath 42 is held bent in a U-shape by corresponding plastic components 43 so that the end 44 of the core, which can form the locking bolt, protrudes into the body hollow 3 into guide sleeve 16 of the tank filler neck and can interact with the closure part 6 of the body flap (see FIG. 4).

What is claimed is:

1. A body flap for the tank filler neck with a remote unlocking mechanism in which a locking bolt can be engaged with a spring and disengaged with a solenoid, from a closure part on the body flap, wherein the solenoid and the locking bolt are arranged in side limbs of a U-shaped plastic component, which has a U-shaped cross section, and an armature rod of the solenoid is connected to the locking bolt via a two-armed lever arm which is mounted such that it can pivot about a pivot in a base of the U-shaped plastic component.

2. The body flap for the tank filler neck as claimed in claim 1, wherein the solenoid and the locking bolt are connected to each other via a Bowden cable arrangement, the armature rod of the solenoid acting upon a core of the Bowden cable arrangement which is laid in the U-shaped bend above the U-shaped plastic component, and another end of the core of the Bowden cable arrangement forming the locking bolt for the body flap.

3. The body flap for the tank filler neck as claimed in claim 1 wherein a pull handle acts on a bolt of a two-armed lever which can be pivoted about a pivot bolt and whose other lever arm acts on a lever linkage or a Bowden cable arrangement in a unlocking direction.

* * * * *